(12) United States Patent
Ku et al.

(10) Patent No.: US 11,962,670 B2
(45) Date of Patent: *Apr. 16, 2024

(54) METHOD AND APPARATUS FOR CONTENT SELECTION BASED ON PERSONAL PROFILES

(71) Applicant: AT&T Intellectual Property I, L.P., Atlanta, GA (US)

(72) Inventors: Bernard Ku, Austin, TX (US); Weidong Hu, Austin, TX (US); Armstrong Soo, Alpharetta, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 1310 days.

This patent is subject to a terminal disclaimer.

(21) Appl. No.: 16/511,865

(22) Filed: Jul. 15, 2019

(65) Prior Publication Data
US 2019/0342424 A1    Nov. 7, 2019

Related U.S. Application Data

(63) Continuation of application No. 15/491,737, filed on Apr. 19, 2017, now Pat. No. 10,356,210, which is a continuation of application No. 14/935,811, filed on Nov. 9, 2015, now Pat. No. 9,654,597, which is a continuation of application No. 12/510,032, filed on Jul. 27, 2009, now Pat. No. 9,251,147.

(51) Int. Cl.
| | | |
|---|---|---|
| G06F 13/00 | (2006.01) | |
| G06F 16/435 | (2019.01) | |
| G06F 16/438 | (2019.01) | |
| G06F 16/9535 | (2019.01) | |
| G06F 16/9537 | (2019.01) | |
| H04L 67/02 | (2022.01) | |
| H04L 67/306 | (2022.01) | |
| H04L 67/52 | (2022.01) | |
| H04L 67/63 | (2022.01) | |
| H04W 4/02 | (2018.01) | |
| H04W 4/021 | (2018.01) | |

(52) U.S. Cl.
CPC ............ *H04L 67/63* (2022.05); *G06F 16/435* (2019.01); *G06F 16/4387* (2019.01); *G06F 16/9535* (2019.01); *G06F 16/9537* (2019.01); *H04L 67/02* (2013.01); *H04L 67/306* (2013.01); *H04L 67/52* (2022.05); *H04W 4/021* (2013.01); *H04W 4/023* (2013.01)

(58) Field of Classification Search
CPC ....... H04L 67/63; H04L 67/02; H04L 67/306; H04L 67/52; G06F 16/435; G06F 16/4387; G06F 16/9535; G06F 16/9537; H04W 4/021; H04W 4/023
USPC .................. 709/217–219, 231, 220–222
See application file for complete search history.

(56) References Cited

U.S. PATENT DOCUMENTS

| | | | |
|---|---|---|---|
| 6,199,099 B1 * | 3/2001 | Gershman | G06F 16/9537 709/201 |
| 9,251,147 B2 * | 2/2016 | Ku | H04W 4/021 |
| 9,654,597 B2 * | 5/2017 | Ku | G06F 16/4387 |

(Continued)

*Primary Examiner* — Kenneth R Coulter
(74) *Attorney, Agent, or Firm* — Guntin & Gust, PLC; Dana LeMoine

(57) ABSTRACT

A content selection server including a processor configured to receive personal preference information from a plurality of personal media devices, select content based on the personal preference information, and provide playback of the content.

20 Claims, 4 Drawing Sheets

(56) References Cited

U.S. PATENT DOCUMENTS

| | | |
|---|---|---|
| 10,356,210 B2 * | 7/2019 | Ku .................... H04W 4/023 |
| 2003/0221541 A1 | 12/2003 | Platt |
| 2005/0240661 A1 | 10/2005 | Heller et al. |
| 2007/0214252 A1 | 9/2007 | Kushima |
| 2007/0266065 A1 | 11/2007 | Rosenberg |
| 2008/0059532 A1 | 3/2008 | Kazmi et al. |
| 2008/0081558 A1 | 4/2008 | Dunko et al. |
| 2008/0091717 A1 | 4/2008 | Garbow et al. |
| 2008/0278894 A1 | 11/2008 | Chen et al. |
| 2010/0077017 A1 | 3/2010 | Martinez et al. |
| 2010/0114979 A1 | 5/2010 | Petersen |

* cited by examiner

METHOD AND APPARATUS FOR CONTENT SELECTION BASED ON PERSONAL PROFILES

CROSS-REFERENCE TO RELATED APPLICATION

The present application is a continuation of and claims priority to U.S. patent application Ser. No. 15/491,737, filed on Apr. 19, 2017, now U.S. Pat. No. 10,356,210, which is a continuation of and claims priority to U.S. patent application Ser. No. 14/935,811, filed on Nov. 9, 2015, now U.S. Pat. No. 9,654,597, which is a continuation of and claims priority to U.S. patent application Ser. No. 12/510,032, filed on Jul. 27, 2009, now U.S. Pat. No. 9,251,147, which are both hereby incorporated by reference in their entirety.

FIELD OF THE DISCLOSURE

The present disclosure generally relates to communications networks, and more particularly relates to a method and apparatus for content selection based on personal profiles.

BACKGROUND

Packet-switched networks, such as networks based on the TCP/IP protocol suite, can distribute a rich array of digital content to a variety of client applications. One popular application is a personal computer browser for retrieving documents over the Internet written in the Hypertext Markup Language (HTML). Frequently, these documents include embedded content. Where once the digital content consisted primarily of text and static images, digital content has grown to include audio and video content as well as dynamic content customized for an individual user.

It is often advantageous when distributing digital content across a packet-switched network to divide the duty of answering content requests among a plurality of geographically dispersed servers. For example, popular Web sites on the Internet often provide links to "mirror" sites that replicate original content at a number of geographically dispersed locations. A more recent alternative to mirroring is content distribution networks (CDNs) that dynamically redirect content requests to a cache server situated closer to the client issuing the request. CDNs either co-locate cache servers within Internet Service Providers or deploy them within their own separate networks.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
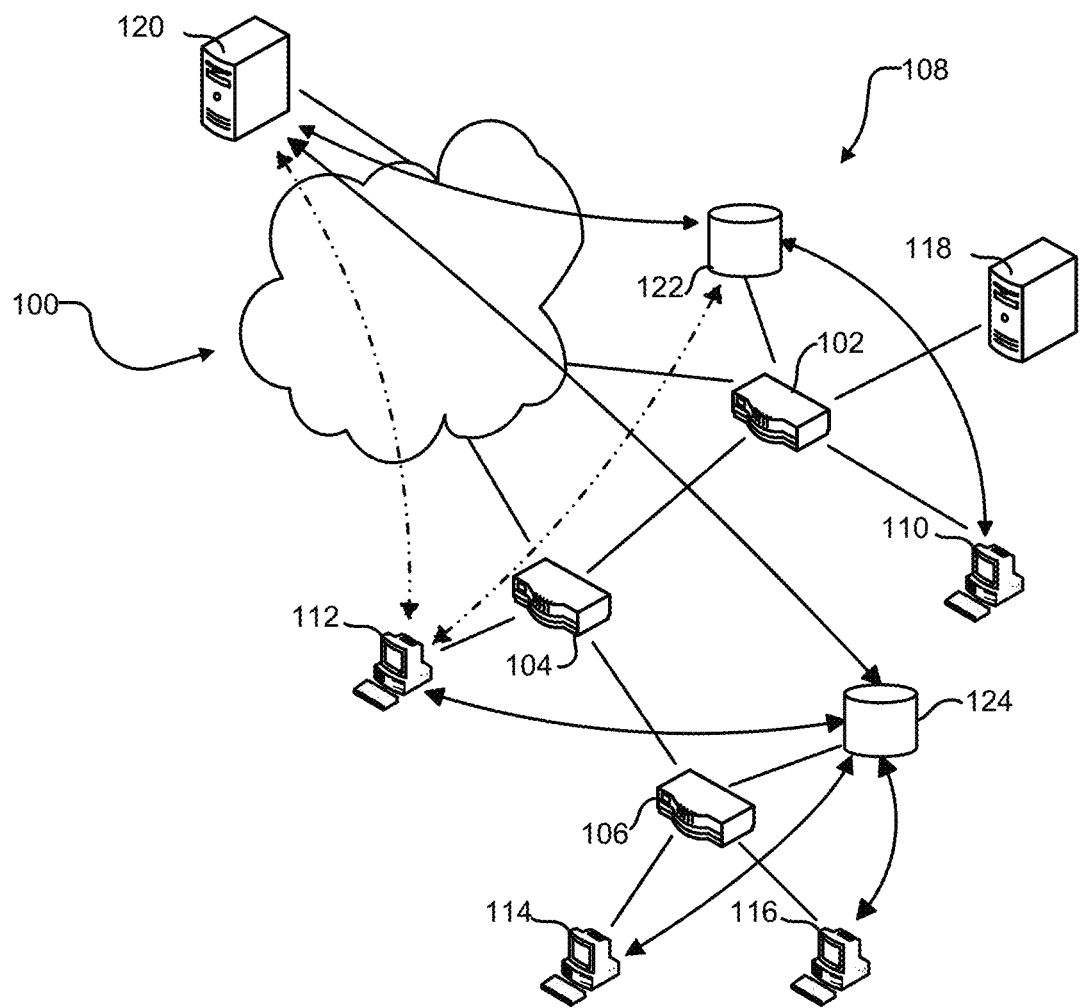
FIG. 1 is a block diagram illustrating a communications network in accordance with one embodiment of the present disclosure.

FIG. 1 shows a geographically dispersed network 100, such as the Internet. Network 100 can include routers 102, 104, and 106 that communicate with each other and form an autonomous system (AS) 108. AS 108 can connect to other ASs that form network 100 through peering points at routers 102 and 104. Additionally, AS 108 can include client systems 110, 112, 114, and 116 connected to respective routers 102, 104, and 106 to access the network 100. Router 102 can provide ingress and egress for client system 110. Similarly, router 104 can provide ingress and egress for client system 112. Router 106 can provide ingress and egress for both of client systems 114 and 116.

AS 108 can further include a Domain Name System (DNS) server 118. DNS server 118 can translate a human readable hostname, such as www.att.com, into an Internet Protocol (IP) address. For example, client system 110 can send a request to resolve a hostname to DNS server 118. DNS server 118 can provide client system 110 with an IP address corresponding to the hostname. DNS server 118 may provide the IP address from a cache of hostname-IP address pairs or may request the IP address corresponding to the hostname from an authoritative DNS server for the domain to which the hostname belongs.

Client systems 110, 112, 114, and 116 can retrieve information from a server 120. For example, client system 112 can retrieve a web page provided by server 120. Additionally, client system 112 may download content files, such as graphics, audio, and video content, and program files such as software updates, from server 120. The time required for client system 112 to retrieve the information from the server 120 normally is related to the size of the file, the distance the information travels, and congestion along the route. Additionally, the load on the server 120 is related to the number of client systems 110, 112, 114, and 116 that are actively retrieving information from the server 120. As such, the resources such as processor, memory, and bandwidth available to the server 120 limit the number of client systems 110, 112, 114, and 116 that can simultaneously retrieve information from the server 120.

Additionally, the network can include cache servers 122 and 124 that replicate content on the server 120 and that can be located more closely within the network to the client systems 110, 112, 114, and 116. Cache server 122 can link to router 102, and cache server 124 can link to router 106. Client systems 110, 112, 114, and 116 can be assigned cache server 122 or 124 to decrease the time needed to retrieve information, such as by selecting the cache server closer to the particular client system. The network distance between a cache server and client system can be determined by network cost and access time. As such, the effective network distance between the cache server and the client system may be different from the geographic distance.

When assigning cache servers 122 and 124 to client systems 110 through 116, the cache server closest to the client can be selected. The closest cache server may be the cache server having a shortest network distance, a lowest network cost, a lowest network latency, a highest link capacity, or any combination thereof. Client system 110 can be assigned cache server 122, and client systems 114 and 116 can be assigned to cache server 124. The network costs of assigning client system 112 to either of cache server 122 or 124 may be substantially identical. When the network costs associated with the link between router 102 and router 104 are marginally lower than the network costs associated with the link between router 104 and router 106, client 112 may be assigned to cache server 124.

Client system 112 may send a request for information to cache server 124. If cache server 124 has the information stored in a cache, it can provide the information to client system 112. This can decrease the distance the information travels and reduce the time to retrieve the information. Alternatively, when cache server 124 does not have the information, it can retrieve the information from server 120 prior to providing the information to the client system 112. In an embodiment, cache server 124 may attempt to retrieve the information from cache server 122 prior to retrieving the information from server 120. The cache server 124 may retrieve the information from the server 120 only once, reducing the load on server 120 and network 100 such as, for example, when client system 114 requests the same information.

Cache server 124 can have a cache of a limited size. The addition of new content to the cache may require old content to be removed from the cache. The cache may utilize a least recently used (LRU) policy, a least frequently used (LFU) policy, or another cache policy known in the art. When the addition of relatively cold or less popular content to the cache causes relatively hot or more popular content to be removed from the cache, an additional request for the relatively hot content can increase the time required to provide the relatively hot content to the client system, such as client system 114. To maximize the cost and time savings of providing content from the cache, the most popular content may be stored in the cache, while less popular content is retrieved from server 120.

In an embodiment, the content selection server may provide different content to different locations within the business or commerce location. For example, within a doctor's office, the content selection server may provide content to a waiting area based on the patients within the waiting area while also providing content to each examination area selected specifically for the patient within the examination area. Similarly, within a clothing store, the content selection server may provide customized content within each dressing room.

Figure 2:
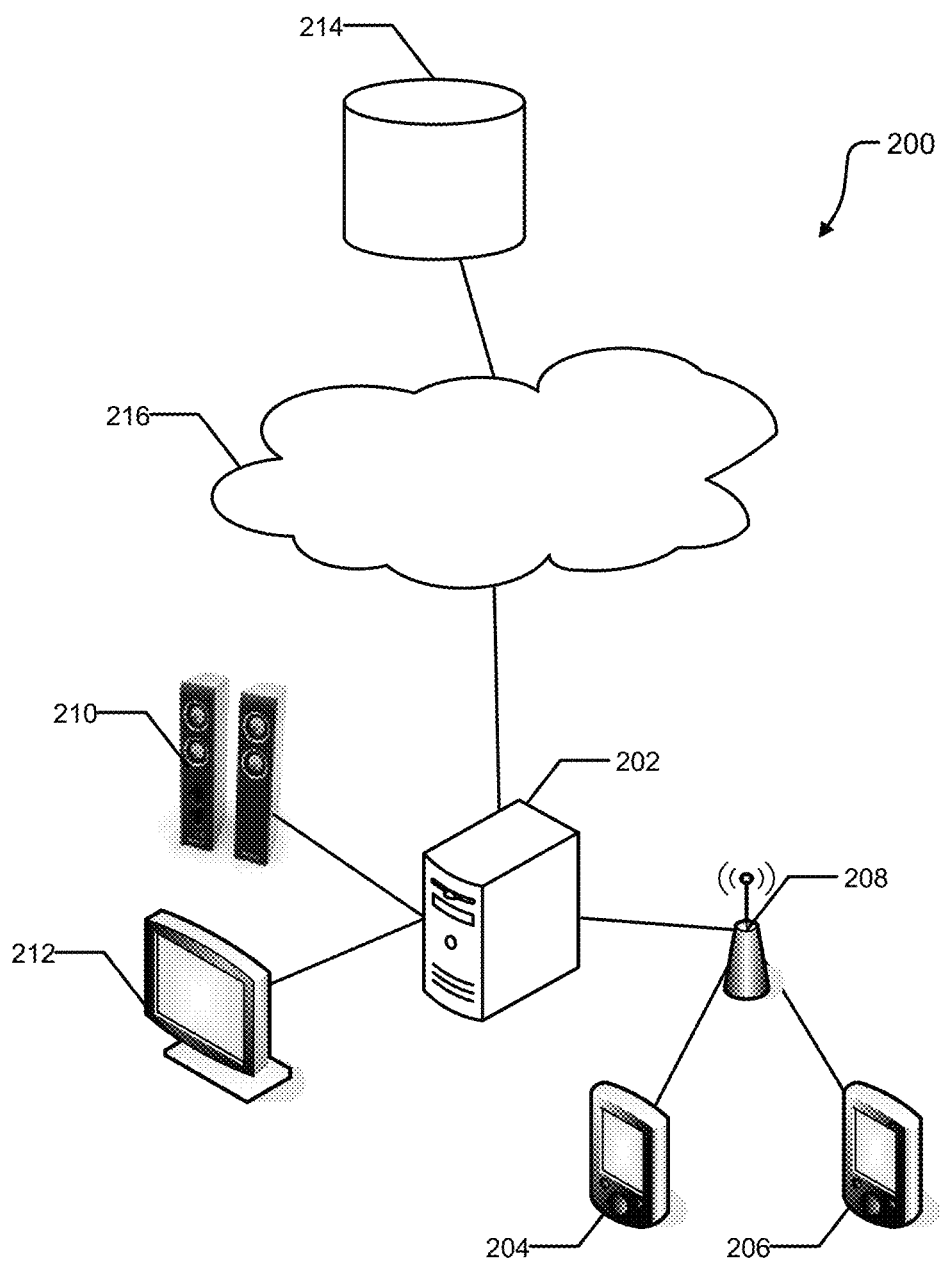
FIG. 2 is a block diagram illustrating a content selection system in accordance with one embodiment of the present disclosure.

FIG. 2 illustrates a content selection system 200 that can be used in conjunction with communications network 100. The content selection system 200 may be located at a business or commerce location and enable selection of audio or video content based on the preferences of customers at the location. For example, a retail outlet such as a clothing store may provide background music for shoppers to listen to while within the store. Using the content selection system 200, the background music can be selected to appeal to the shoppers currently within the store. Additionally, the retail outlet may have a video display that can be used for displaying a music video corresponding to the background music or other video content that may appeal to the shoppers currently within the store.

The content selection system 200 can include a content selection server 202. The content selection server 202 can receive information from personal media devices 204 and 206 through access point 208. The access point 208 can communicate with the personal media devices 204 and 206 using a wireless communications protocol, such as Bluetooth or Wi-Fi (802.1a/b/g/n). The content selection server 202 may receive personal preference information from the personal media devices 204 and 206. Based on the personal preference information, the content selection server 202 can select content for playback through audio system 210 and/or video system 212. The content selection server 202 can receive content from a content library 214 through a network 216 when the content is not previously stored by the content selection server 202. In an embodiment, the content library may be available through a content delivery network, such as at cache server 122. The content may be streamed to the content selection server 202 from the content library 214, or the content selection server 202 may download the content from the content library.

Figure 3:
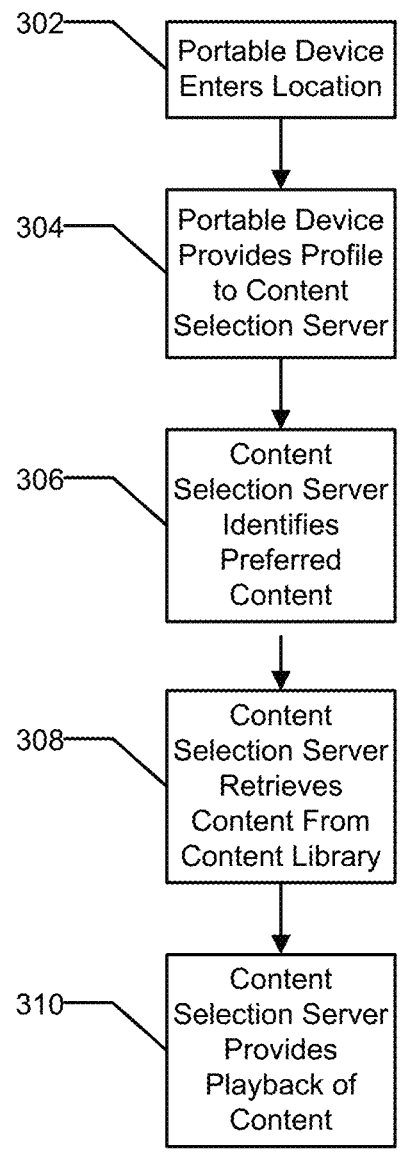
FIG. 3 is a flow diagram illustrating an exemplary method of selecting content based on personal profiles in accordance with one embodiment of the present disclosure.

FIG. 3 illustrates an exemplary method of selecting content based on personal preference information. At 302, a customer with a personal media device, such as personal media device 204, can enter a commerce location. The personal media device can be a smart phone such as a Blackberry or an iPhone, a personal data assistant, a personal media player such as an iPod, or other similar portable devices that can store and transmit information. Additionally, the personal media device can be capable of wireless communication, such as by using Bluetooth or a Wi-Fi network.

At 304, the personal media device can provide a profile to a content selection server, such as content selection server 202. The profile can include personal preference information. The personal preference information can include information about a user's music preferences, such as favorite songs, favorite artists, song ratings, and the like. Additionally, the personal preference information can include information about video content, such as favorite television shows and movies. In an embodiment, the personal preference information may include information about content stored on the personal media device. Alternatively, the personal preference information can be a list of content compiled by the user that may be unrelated to content stored on the personal media device. For example, a personal device without media playback capabilities can provide a list of preferred songs that has been created by the user.

At 306, the content selection server can identify preferred content for playback. Depending on the number of profiles currently available, the content selection server may randomly select a content from a list of favorite or highly ranked content, or may apply a selection algorithm to determine content that would be preferred by the greatest number of customers. In an embodiment, the selection algorithm may utilize favorite song lists from a plurality of profiles to identify songs that are common among a number of profiles and select the preferred song from the greatest number of profiles.

In yet another embodiment, the selection algorithm can identify songs similar to songs listed in a plurality of profiles. For example, when multiple user profiles do not have any songs in common, similar songs may be enjoyed by a number of the users. The selection algorithm can analyze the songs listed in the profiles to identify similar songs. In this way, the selection algorithm may identify a favorite song from one profile that is similar to a favorite song in another profile and select one of the two similar songs for playback. Alternatively, the selection algorithm may select a new song that is similar to songs from a number of profiles and provide playback of the new song as a way of introducing the new song to an audience that is likely to enjoy the song. For example, the content selection server may be located at a bar or a club and automatically generate a mixture of new songs, rare songs, and well known songs that are likely to be enjoyed by the customers present within the bar or club.

In a further embodiment, the selection algorithm may select songs from a genre or set of genres appropriate for the commerce location. For example, a content selection system in a doctor's office may limit the selected songs to light or relatively quiet and soothing music, whereas a content selection system at a trendy fashion boutique may select songs that are more stimulating. Additionally, the selection algorithm may exclude songs that are offensive or have explicit lyrics. Further, the content selection system may maintain a list of excluded songs.

At 308, the content selection server may retrieve the content from a content library, and at 310, the content selection server may provide playback of the content through the audio and/or video systems of the commerce location. Alternatively, the content selection server may have previously downloaded the content and provide playback directly without needing to retrieve the content from the content library.

Figure 4:
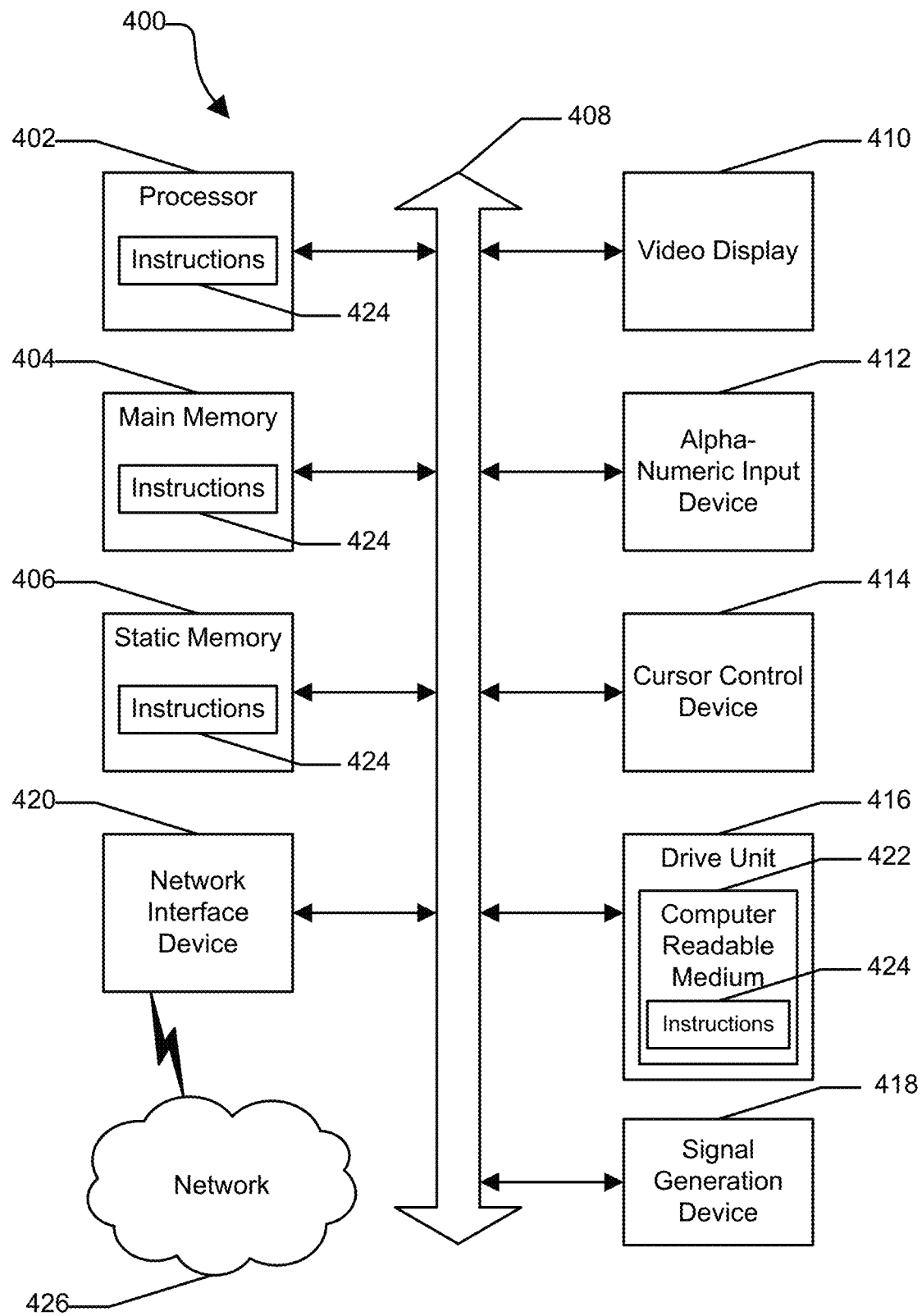
FIG. 4 is an illustrative embodiment of a general computer system.

FIG. 4 shows an illustrative embodiment of a general computer system 400. The computer system 400 can include a set of instructions that can be executed to cause the computer system to perform any one or more of the methods or computer based functions disclosed herein. The computer system 400 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 400 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

The computer system 400 may include a processor 402, such as a central processing unit (CPU), a graphics processing unit (GPU), or both. Moreover, the computer system 400 can include a main memory 404 and a static memory 406 that can communicate with each other via a bus 408. As shown, the computer system 400 may further include a video display unit 410 such as a liquid crystal display (LCD), an organic light emitting diode (OLED), a flat panel display, a solid-state display, or a cathode ray tube (CRT). Additionally, the computer system 400 may include an input device 412 such as a keyboard, and a cursor control device 414 such as a mouse. Alternatively, input device 412 and cursor control device 414 can be combined in a touchpad or touch sensitive screen. The computer system 400 can also include a disk drive unit 416, a signal generation device 418 such as a speaker or remote control, and a network interface device 420 to communicate with a network 426. In a particular embodiment, the disk drive unit 416 may include a computer-readable medium 422 in which one or more sets of instructions 424, such as software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. .sctn.1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A system, comprising:
 a memory that stores instructions; and
 a processor that executes the instructions to perform operations, the operations comprising:

receiving a first user profile including preference information corresponding to a first user and to a first plurality of personal devices located in a first location including a list of favorite content corresponding to the first plurality of personal devices;

identifying first alternative content corresponding to the first plurality of personal devices based on the list of favorite content and based on a first location type of the first location; and based on a number of user profiles currently available, choosing between randomly selecting content from the list of favorite content for playback and applying a selection algorithm to determine content that would be preferred by a greatest number of users.

2. The system of claim 1, wherein the operations further comprise receiving the first user profile as the first user and the first plurality of personal devices enter the first location.

3. The system of claim 1, wherein the operations further comprise identifying preferred content for playback.

4. The system of claim 1, wherein the operations further comprise retrieving the content from the list of favorite content, the first alternative content, or a combination thereof, from a content library.

5. The system of claim 1, wherein the operations further comprise facilitating playback of the content from the list of favorite content, the first alternative content, or a combination thereof, via an audio system of the first location.

6. The system of claim 1, wherein the operations further comprise identifying the first alternative content based on a content genre appropriate for the first location.

7. The system of claim 1, wherein the operations further comprise excluding offensive content, explicit content, or a combination thereof, from the first alternative content.

8. The system of claim 1, wherein the operations further comprise maintaining a list of excluded content.

9. The system of claim 1, wherein the operations further comprise receiving a list of preferred content from a first device of the first plurality of personal devices that does not have a media playback capability.

10. The system of claim 1, wherein the operations further comprise identifying second alternative content based on the first plurality of personal devices moving to a second location.

11. The system of claim 1, wherein the operations further comprise enabling a content library for providing the first alternative content to be made available via a content delivery network.

12. The system of claim 1, wherein the operations further comprise causing playback of the first alternative content at the first location.

13. The system of claim 1, wherein the operations further comprise determining if a first favorite content from the list of favorite content is similar to a second favorite content included in a second user profile.

14. A method, comprising:

receiving a first user profile including preference information corresponding to a first user and to a first plurality of personal devices located in a first location including a list of favorite content corresponding to the first plurality of personal devices;

identifying, by utilizing instructions from a memory that are executed by a processor, first alternative content corresponding to the first plurality of personal devices based on the list of favorite content and based on a first location type of the first location; and based on a number of user profiles currently available, choosing between randomly selecting content from the list of favorite content for playback and applying a selection algorithm to determine content that would be preferred by a greatest number of users.

15. The method of claim 14, further comprising generating a mixture including the first alternative content and the favorite content from the list of favorite content.

16. The method of claim 14, further comprising identifying the first alternative content based on a determination that the first user profile does not list content in common with a second user profile.

17. The method of claim 14, further comprising selecting, after identifying the first alternative content, the first alternative content for playback at the first location.

18. The method of claim 14, further comprising ranking each list of favorite content based on a number of occurrences of the content and occurrences of similar content.

19. The method of claim 14, further comprising receiving the first user profile as the first user and the first plurality of personal devices enter the first location.

20. A non-transitory computer-readable medium comprising instructions, which, when loaded and executed by a processor, cause the processor to perform operations, the operations comprising:

accessing a first user profile including preference information corresponding to a first user and to a first plurality of personal devices located in a first location including a list of favorite content corresponding to the first plurality of personal devices;

determining first alternative content corresponding to the first plurality of personal devices based on the list of favorite content and based on a first location type of the first location; and based on a number of user profiles currently available, choosing between randomly selecting content from the list of favorite content for playback and applying a selection algorithm to determine content that would be preferred by a greatest number of users.

* * * * *